United States Patent
Lee

(10) Patent No.: US 9,195,874 B2
(45) Date of Patent: Nov. 24, 2015

(54) APPARATUS AND METHOD FOR RECOGNIZING BARCODE

(75) Inventor: Sangyong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 5 days.

(21) Appl. No.: 13/994,012

(22) PCT Filed: Nov. 10, 2011

(86) PCT No.: PCT/KR2011/008560
§ 371 (c)(1),
(2), (4) Date: Jun. 13, 2013

(87) PCT Pub. No.: WO2012/081832
PCT Pub. Date: Jun. 21, 2012

(65) Prior Publication Data
US 2013/0256417 A1     Oct. 3, 2013

(30) Foreign Application Priority Data
Dec. 16, 2010 (KR) .................. 10-2010-0129184

(51) Int. Cl.
*G06K 7/10*     (2006.01)
*G06K 7/14*     (2006.01)

(52) U.S. Cl.
CPC ............ *G06K 7/1486* (2013.01); *G06K 7/1413* (2013.01); *G06K 7/1452* (2013.01)

(58) Field of Classification Search
USPC .................................. 235/462.01–462.49
See application file for complete search history.

(56) References Cited

U.S. PATENT DOCUMENTS

| | | | |
|---|---|---|---|
| 6,015,089 A | 1/2000 | Hecht et al. | |
| 7,562,820 B2 | 7/2009 | Muramatsu | |
| 2011/0290880 A1* | 12/2011 | Cai et al. | ............. 235/437 |

FOREIGN PATENT DOCUMENTS

| | | |
|---|---|---|
| JP | 10-091717 A | 4/1998 |
| JP | 2000-507727 A | 6/2000 |
| WO | WO-96/07155 A1 | 3/1996 |
| WO | WO-2004/055713 A1 | 7/2004 |

OTHER PUBLICATIONS

International Search Report in International Application No. PCT/KR2011/008560, filed Nov. 10, 2011.

\* cited by examiner

*Primary Examiner* — Jamara Franklin
(74) *Attorney, Agent, or Firm* — Saliwanchik, Lloyd & Eisenschenk

(57) ABSTRACT

An apparatus and method for recognizing a barcode is disclosed, the recognizing method including steps of selecting and interpolating X-axis data at an arbitrary Y-axis of the barcode, detecting peaks of black and white modules of the barcode and restoring the barcode, and estimating widths of the black and white modules, extracting binary data and decoding the binary data.

20 Claims, 10 Drawing Sheets

APPARATUS AND METHOD FOR RECOGNIZING BARCODE

CROSS-REFERENCE TO RELATED APPLICATIONS

This application is the U.S. national stage application of International Patent Application No. PCT/KR2011/008560, filed Nov. 10, 2011, which claims priority to Korean Application No. 10-2010-0129184, filed Dec. 16, 2010, the disclosures of each of which are incorporated herein by reference in their entirety.

TECHNICAL FIELD

The present invention relates generally to an apparatus and method for recognizing a barcode and, more particularly, to an apparatus and method for recognizing a barcode, used for a mobile terminal with a photographing means.

BACKGROUND ART

It is known that barcodes were first invented in 1932 through a thesis entitled "automation of calculation in supermarket" by Wallace Flin, and are currently printed on almost all items. A point of sale (POS) system automatically manages a buying process or a selling process using the barcodes. Further, the use of the barcodes has been rapidly increased with development of information technology (IT) for mail automation, factory automation, inventory control, library management, documentation management, and medical information management.

The barcodes are classified into two categories, that is, 1-dimensional barcodes such as Universal Product Code (UPC), European Article Numbering (EAN), Korean Article Numbering (KAN), code39, code93, and code128, and 2-dimensional barcodes such as code49, code16K, PDF-417, codablock, datacode, vericode, softstrip, and code1. The 2-dimensional barcode can contain up to 5,000 letters.

Readers for recognizing the barcodes include a laser reader, a light emitting diode (LED) reader, and a charge coupled device (CCD) reader according to devices used for the readers. Among them, the laser reader has been widely used because it can rapidly recognize the barcode. However, the laser reader is problematic in that it may recognize only the 1-dimensional barcode and is relatively expensive.

In recent years, there have been developed many readers using the CCD that can recognize the 2-dimensional barcode containing much information.

Meanwhile, with the advent of a smart phone, an application for acquiring a barcode image in real time and searching for a price and a bottom price of goods is developed.

A barcode signal is configured by continuously combining black and white modules, and information is encoded depending on a width of each module and a ratio of the modules. In order to precisely decode information, a size of each module must be restored within a margin of error. However, a barcode image acquired by a photographing means such as a camera may be blurred by focusing of the camera, and image noise may be caused by non-uniform illumination and barcode exposure environment at the time of acquiring the image. Thus, these factors must be overcome.

DISCLOSURE OF INVENTION

Technical Problem

Accordingly, the present invention has been made keeping in mind the above problems occurring in the prior art, and an object of the present invention is to provide an apparatus and method for recognizing a barcode, intended to detect peaks of white and black modules of a barcode and to estimate a size of each module, thus enabling the barcode to be precisely recognized.

Solution to Problem

In order to accomplish the above object, there is provided an apparatus for recognizing a barcode, the apparatus comprising an extraction unit for selecting and interpolating X-axis data at an arbitrary Y-axis of the barcode; a restoration unit for detecting peaks of black and white modules of the barcode and restoring the barcode; and a decoding unit for estimating widths of the black and white modules, extracting binary data and decoding the binary data.

In a preferred embodiment, the extraction unit includes a selection unit for selecting the X-axis data at the arbitrary Y-axis, and an interpolation unit for interpolating the X-axis data selected by the selection unit using a predetermined interpolation method.

In another preferred embodiment, the selection unit converts RGB types of X-axis data into black-and-white data.

In still another preferred embodiment, the selection unit converts RGB types of X-axis data into peaked data when intensity of a white module signal is high and peaked data when intensity of a black module signal is high.

In yet another preferred embodiment, the interpolation method includes cubic spline interpolation.

In still yet another preferred embodiment, the restoration unit includes a peak detection unit for detecting the peaks of the black and white modules; a barcode-region detection unit for detecting an effective barcode region from output of the peak detection unit; a normalizing unit for removing a baseline; and an estimation unit for converting an output of the normalizing unit into a square wave.

In a further preferred embodiment, the peak detection unit detects peaks of the black and white modules using a descending slope trace wave (DSTW) method.

In another preferred embodiment, the peak detection unit obtains a DSTW signal for each of the black and white modules, detects a point where a difference between each of the black and white modules and the corresponding DSTW signal exceeds a predetermined value, and determines a point where previous data becomes zero (0) as a peak.

In still another preferred embodiment, the barcode-region detection unit removes an unnecessary peak from the peak of the data received from the peak detection unit, thus detecting the effective barcode region.

In yet another preferred embodiment, the barcode-region detection unit detects a position from which the effective barcode starts, thus detecting a predetermined number of peaks of subsequent black and white modules.

In still yet another preferred embodiment, the barcode-region detection unit calculates a difference in position between a subsequent peak and a current peak, and detects a position where the difference in position between the subsequent peak and the current peak is greater than a sum thereof and a predetermined weight, thus determining the detected position as a position from which the effective barcode starts.

In a further preferred embodiment, the barcode-region detection unit detects a predetermined number of peaks of black and white modules subsequent to the position from which the effective barcode starts.

In another preferred embodiment, the normalizing unit calculates a mean of peak data, thus removing distortion of the baseline.

In still another preferred embodiment, the decoding unit performs decoding in ASCII.

In yet another preferred embodiment, the decoding unit estimates a distance between pixels of the black and white modules from the output of the normalizing unit.

In still yet another preferred embodiment, the decoding unit sorts distances between the pixels, and determines a module width based on a boundary value depending on the module width.

In a further preferred embodiment, the decoding unit converts binary data of the module width.

Further, in order to accomplish the above object, there is provided a method for recognizing a barcode, comprising steps of selecting and interpolating X-axis data at an arbitrary Y-axis of the barcode; detecting peaks of black and white modules of the barcode and restoring the barcode; and estimating widths of the black and white modules, extracting binary data and decoding the binary data.

Advantageous Effects of Invention

The present invention is advantageous in that peaks of white and black modules of a barcode are detected and a size of each module is estimated to recognize a barcode, thus achieving a high barcode recognition rate even under environment where there are non-uniform illumination, blurring and white noise.

BRIEF DESCRIPTION OF DRAWINGS

FIG. 4b is a graph illustrating data selected by a selection unit according to an embodiment of the present invention at an arbitrary Y-axis data of FIG. 4a;

FIG. 5b is a graph illustrating data selected by the selection unit according to the embodiment of the present invention at an arbitrary Y-axis data of FIG. 5a;

FIG. 10b is a graph illustrating peaks detected in FIG. 10a;

FIG. 10c is a graph illustrating a result of detecting effective barcode peaks of FIG. 10a;

MODE FOR THE INVENTION

Figure 1:
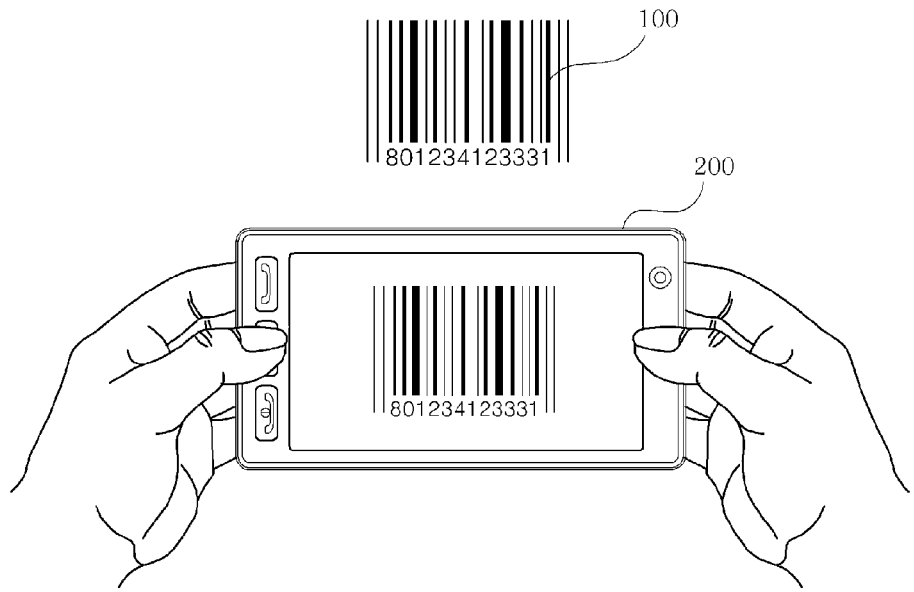
FIG. 1 is a view illustrating a state of photographing a barcode using a mobile terminal.

Since the present invention may be variously changed and include several embodiments, particular embodiments shown in the drawings will be described in detail in the detailed description.

However, it is to be understood that the invention is not limited to the particular embodiments, and various changes, equivalences and substitutions may be made without departing from the scope and spirit of the invention.

Although the terms "first", "second", etc. are used herein to describe various components, these components should not be limited by these terms.

These terms are only used to distinguish one component from another component. For example, the second component may be designated as the first component without departing from the scope of the invention. Similarly, the first component may be designated as the second component.

Further, when the term "couple" or "connect" is used in the specification or claims, it is intended to mean not only "directly coupled or connected to" but also "indirectly coupled or connected to" such as connected through another component or components. In contrast, the term "directly coupled or connected to" means that there is no component between the coupled or connected components.

Also it is to be understood that terms employed herein are for the purpose of description of particular embodiments and not of limitation.

Further, the singular forms "a" and "an" include plural referents unless the context clearly dictates otherwise.

Furthermore, it should be understood that terms "include" or "have" are inclusive of characteristics, numerals, steps, operations, components, parts or combination thereof, which are described herein, but are not exclusive of one or more different characteristics, numerals, steps, operations, components, parts or combination thereof.

It should be understood that the appended drawings are not necessarily to scale for the convenience of description.

Now, the present invention will be described in detail with reference to the accompanying drawings, in which the same reference numerals are used throughout the different drawings to designate the same or similar components and a duplicated description thereof will be omitted.

FIG. 1 is a view illustrating a state of photographing a barcode using a mobile terminal to which the present invention is applied.

As shown in the drawing, a user photographs a barcode 100 using a photographing means such as a camera installed in a mobile terminal 200. An apparatus for recognizing a barcode according to an embodiment of the present invention is received in the mobile terminal 200 to more precisely recognize the barcode acquired by the photographing means.

In the present invention, the term of 'recognition of the barcode' means the decoding of information in the barcode 100 acquired by the mobile terminal 200 having the photographing means such as the camera. Here, the mobile terminal 200 means a portable terminal carried by a user, and includes a cellular phone, a smart phone, a tablet computer, a lap-top computer, etc.

Figure 2:
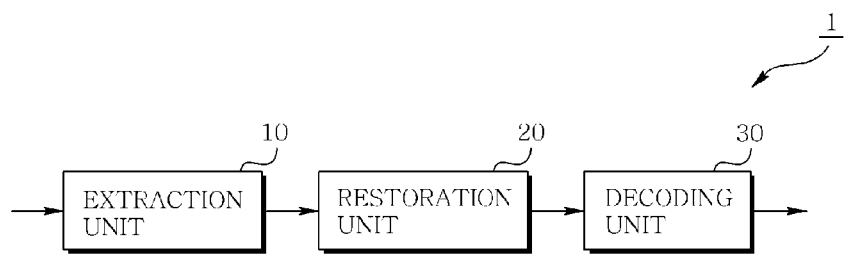
FIG. 2 is a block diagram illustrating a configuration of an apparatus for recognizing a barcode according to an embodiment of the present invention.

FIG. 2 is a block diagram illustrating a configuration of an apparatus for recognizing barcode according to an embodiment of the present invention.

As shown in the drawing, the barcode recognizing apparatus 1 of the present invention includes an extraction unit 10, a restoration unit 20 and a decoding unit 30.

The extraction unit 10 selects X-axis data for any one point of a Y-axis barcode region, from an image photographed and acquired by the photographing means, and extends the number of X-axis pixels using a predetermined interpolation method (e.g. spline interpolation) to provide high resolution. This will be described in more detail with reference to FIG. 3.

Figure 3:
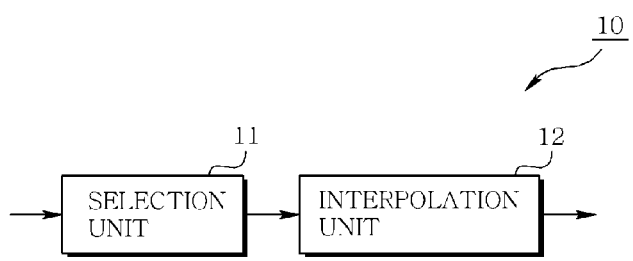
FIG. 3 is a block diagram illustrating a detailed configuration of an extraction unit shown in FIG. 2.

FIG. 3 is a block diagram illustrating a detailed configuration of the extraction unit shown in FIG. 2. As shown in the drawing, the extraction unit 10 of the present invention includes a selection unit 11 and an interpolation unit 12.

Figure 4A:
FIG. 4a is a view illustrating an example of a general barcode.

The selection unit 11 selects X-axis data in any Y axis within an (X, Y) area of the acquired barcode. FIG. 4a is a view illustrating an example of a general barcode.

If the X-axis data is extracted for any Y axis (see A in FIG. 4a), RGB (Red/Green/Blue) types of X-axis data is extracted in 24 bits. Generally, since the barcode is a combination of black lines (hereinafter referred to as 'black modules' and white lines (hereinafter referred to as 'white modules', the selection unit 11 converts the data into black-and-white data as represented in the following equations.

$$G_W[n]=R[n]+G[n]+B[n], 1 \leq n \leq X_{resolution} \quad \text{<Equation 1>}$$

$$G_B[n]=arg_{max}(G_W[n])-G_W[n], 1 \leq n \leq X_{resolution} \quad \text{<Equation 2>}$$

In the above equations, $G_W[n]$ denotes a peaked signal when intensity of the white module is high, and $G_B[n]$ denotes a peaked signal when intensity of the black module is high.

Figure 4B:
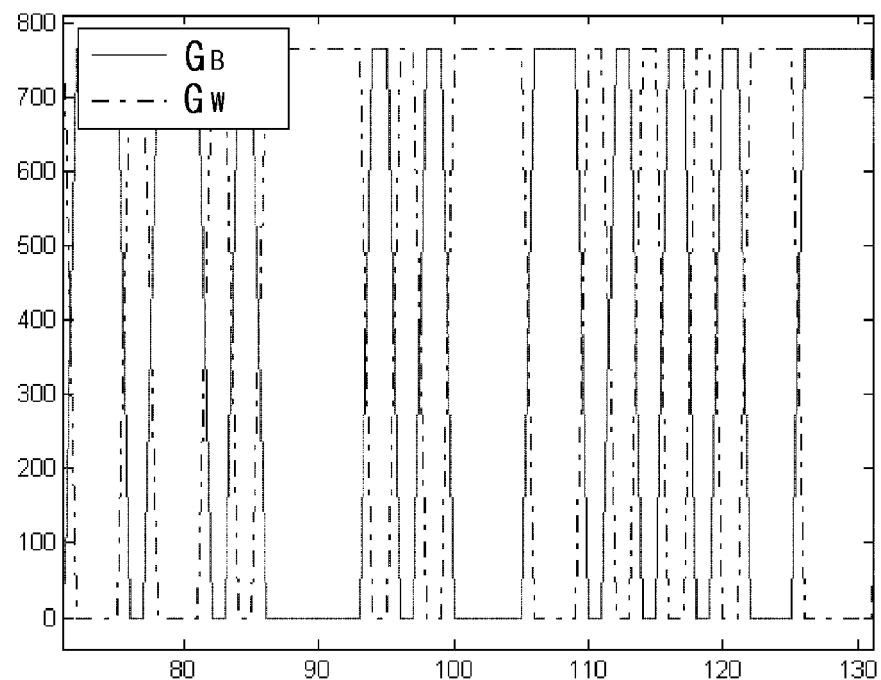

FIG. 4b is a graph illustrating data selected by the selection unit 11 according to an embodiment of the present invention at an arbitrary Y-axis data of FIG. 4a. The drawing shows data extracted by the above equations 1 and 2.

Figure 5A:
FIG. 5a is a view illustrating an image photographing a real barcode.
Figure 5B:
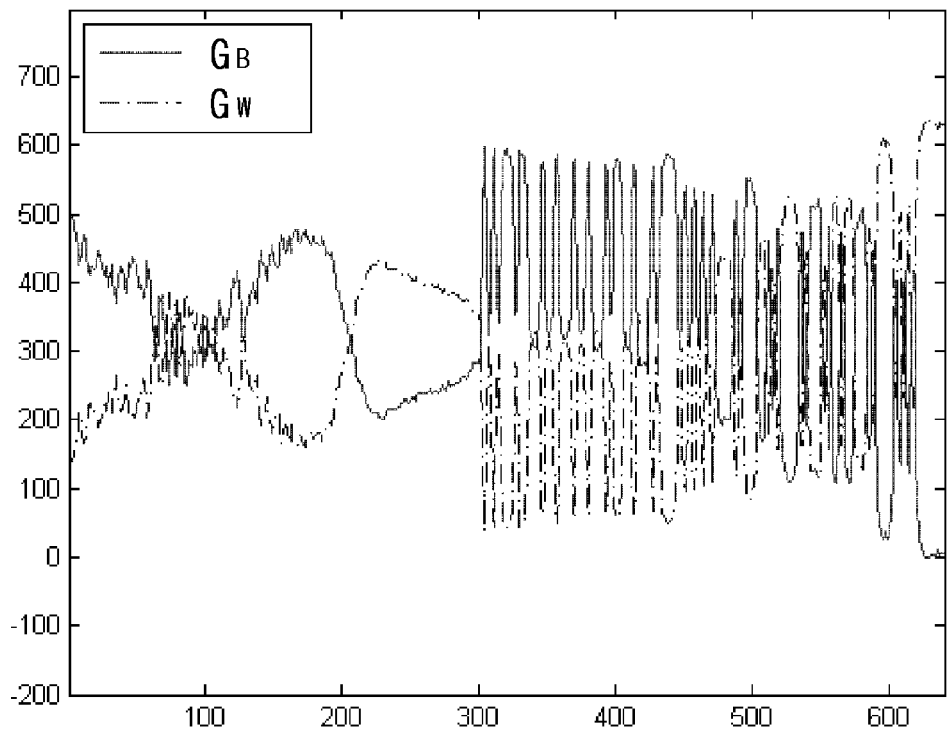

FIG. 5a is a view illustrating an image photographing a real barcode, and FIG. 5b is a graph illustrating data selected by the selection unit 11 according to the embodiment of the present invention at an arbitrary Y-axis data of FIG. 5a. One module of the barcode has a pixel varying according to resolution of the camera. The module generally has about 20 pixels. When acquiring a real barcode image as shown in FIG. 5a, a pixel size of each module is varied depending on illumination, an angle of the camera, and a position of the barcode. This is shown in FIG. 5b.

Thus, the interpolation unit 12 of FIG. 3 interpolates X-axis resolution to a predetermined pixel, preferably 10,000 pixels regardless of the resolution of the camera, using a predetermined interpolation method for acquiring sufficient resolution, for example, cubic spline interpolation.

The restoration unit 20 of FIG. 2 detects peaks of the black and white modules of the barcode from the interpolated data, thus restoring an estimated barcode signal.

Figure 6:
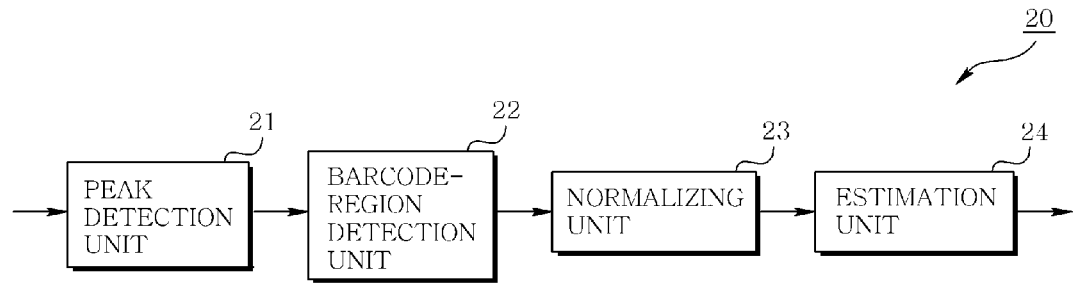
FIG. 6 is a block diagram illustrating a detailed configuration of a restoration unit shown in FIG. 2.

FIG. 6 is a block diagram illustrating a detailed configuration of the restoration unit shown in FIG. 2.

As shown in the drawing, the restoration unit 20 of the present invention includes a peak detection unit 21, a barcode-region detection unit 22, a normalizing unit 23 and an estimation unit 24.

The peak detection unit 21 detects the peak of the interpolated signal. The peak detection unit 21 of the present invention performs a peak detecting operation using a descending slope trace wave (DSTW) method. The DSTW method is originally created to detect a peak of an electrocardiogram signal, and shows an excellent peak detection rate in a signal having various frequencies and phases. Since the formation of a DSTW signal for an original signal is known to those skilled in the art, a detailed description thereof will be omitted.

Figure 7:
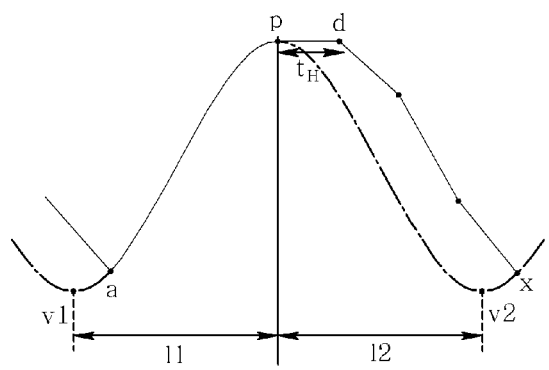
FIG. 7 is a graph illustrating a DSTW method for detecting a peak using a peak detection unit of FIG. 6.

FIG. 7 is a graph illustrating a DSTW method for detecting a peak using the peak detection unit of FIG. 6. In FIG. 7, a dashed line represents the original signal x(n), while a solid line represents the DSTW signal for the original signal, that is, DSTW(n).

As shown in the drawing, the DSTW(n) traces the x(n) from point a to point p. The DSTW(n) has an interval $t_H$ from point p to point d. Thereafter, DSTW(n) traces x(n–$t_H$) until it becomes equal to or less than x(n). Here, $t_H$ may be optionally adjusted according to characteristics of a signal.

Figure 8A:
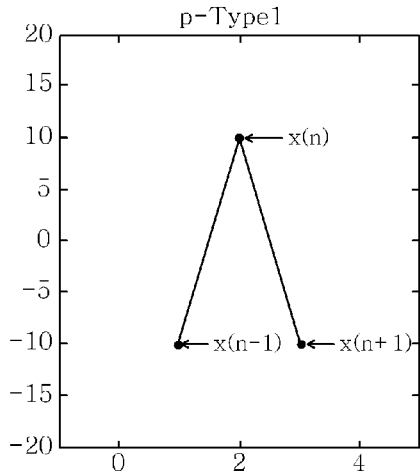
FIGS. 8a and 8b are graphs illustrating kinds of peaks in which a DSTW signal and an original signal are separated.
Figure 8B:
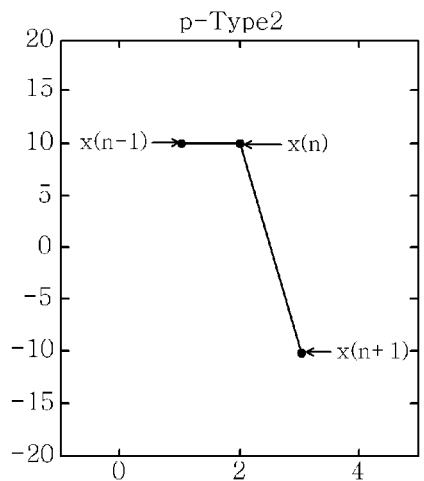

In order to generate an initial DSTW(n), a peak p must be detected at x(n). When detecting the peak p, the characteristics of the signal are divided as shown in FIGS. 8a and 8b. FIGS. 8a and 8b are graphs illustrating kinds of peaks in which a DSTW signal and an original signal are separated;

If the peak p is selected and the DSTW(n) is formed, the peak detection unit 21 detects the peak using the following equations 3 and 4.

$$\text{Diff}(n)=\text{DSTW}(n)-x(n), 1 \leq n \leq 10{,}000 \quad \text{<Equation 3>}$$

$$\text{Threshold}=Arg_{max}[\text{Diff}(n)] \times \text{Weight}, 1 \leq n \leq 10{,}000 \quad \text{<Equation 4>}$$

Here, 'Weight' is a value ranging between 0 and 1. The peak detection unit 21 detects a point exceeding a 'Threshold' at Diff(n), and determines a point at which previous data becomes 0, as a peak. That is, the point satisfying the following equation is detected and is determined as the peak.

if(Diff(n)<Threshold)

While(Diff(n)≠0)                         <Equation 5>

This point is a point p from which DSTW(n) and x(n) are separated, as shown in FIG. 7.

Figure 9A:
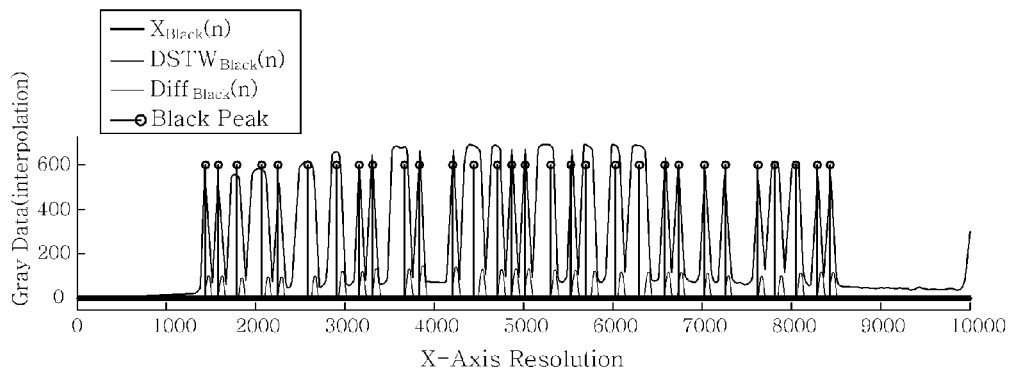
FIGS. 9a and 9b are graphs illustrating a process of detecting peaks of $G_B$ and $G_W$ signals, respectively.
Figure 9B:
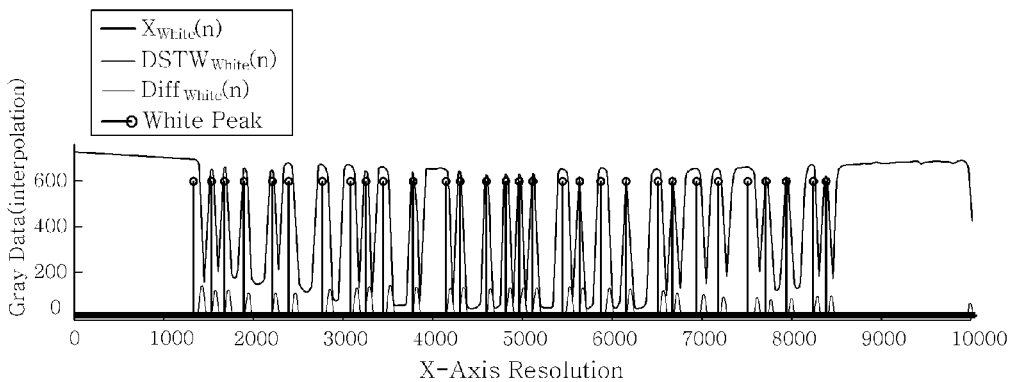
Figure 9C:
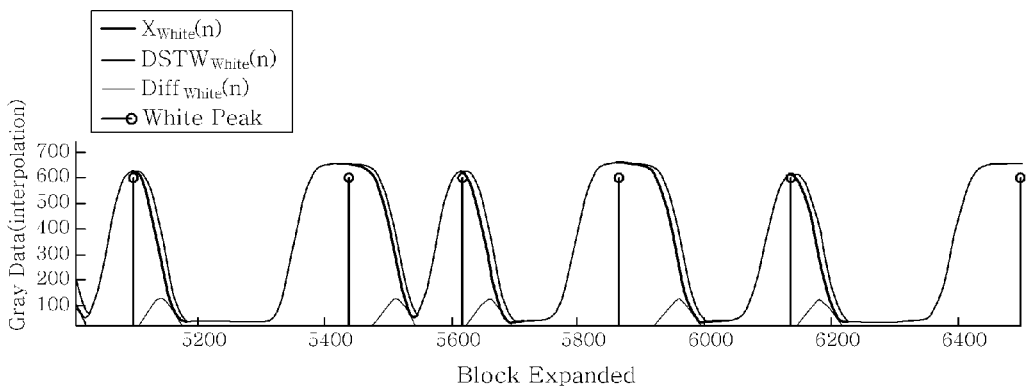
FIG. 9c is a graph extending FIG. 9b in a horizontal axis.

FIGS. 9a and 9b are graphs illustrating a process of detecting peaks of $G_B$ and $G_W$ signals, respectively, and FIG. 9c is a graph extending FIG. 9b in a horizontal axis.

Figure 10A:
FIG. 10a is a view illustrating a barcode image actually acquired according to an embodiment of the present invention.
Figure 10B:
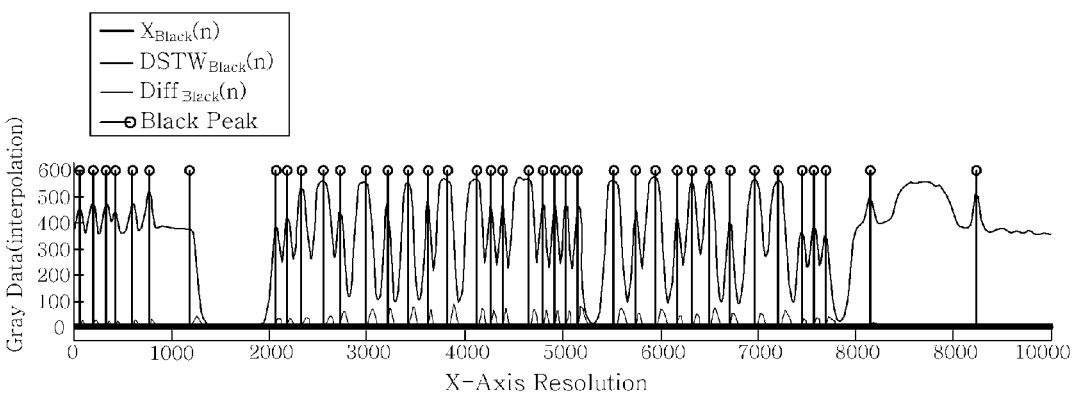

FIG. 10a is a view illustrating an actually acquired barcode image, and FIG. 10b is a graph illustrating peaks detected in FIG. 10a. If the real barcode image is acquired as shown in FIG. 10a, peaks other than the barcode are detected by various shapes and backgrounds of goods as shown in FIG. 10b. An unnecessary peak must be removed to precisely recognize the barcode. The barcode-region detection unit 22 of FIG. 6 removes the unnecessary peak from the image, thus detecting a real barcode region.

That is, the barcode-region detection unit 22 detects a barcode region using characteristics wherein the image of the barcode is printed on a white background and each of the black and white modules of the barcode is set to be 30, in the case of a Universal Product Code (UPC)-A barcode, for example.

Referring to FIG. 10b, no peak is detected in the $G_B$ signal when an index is between 1,000 and 2,000. This area forms the white background of the barcode. The following equations 6 to 8 explain the process of detecting the white background and detecting an effective peak of the barcode.

$$P_D(n)=\text{Index}[P_B(n-1)]-\text{Index}[P_B(n)], 1 \leq n \leq \text{Number of Peak}/2 \quad \text{<Equation 6>}$$

$$T_D(n)=\text{mean}(P_D(n))+w, 1 \leq n \leq \text{Number of Peak}/2 \quad \text{<Equation 7>}$$

if($P_D(n) < T_D(n)$), $D_P = n$, $1 \leq n \leq$ Number of Peak/2  <Equation 8>

In equation 6, Index[$P_B(n)$] means an index (position) of the peak, $P_B(n)$ denotes the peak of the $G_B$ signal, and $P_D(n)$ denotes a difference in position between a subsequent peak and a current peak.

In equation 7, $T_D(n)$ means the 'Threshold', which is the sum of the weight (w) and the mean of $P_D(n)$. In this case, w varies depending on resolution of the camera.

In equation 8, $P_D(n)$ exceeding $T_D$ is detected, where n is an index (position) from which the effective barcode starts. Thereafter, a predetermined number of peaks is detected for the black and white modules.

Figure 10C:
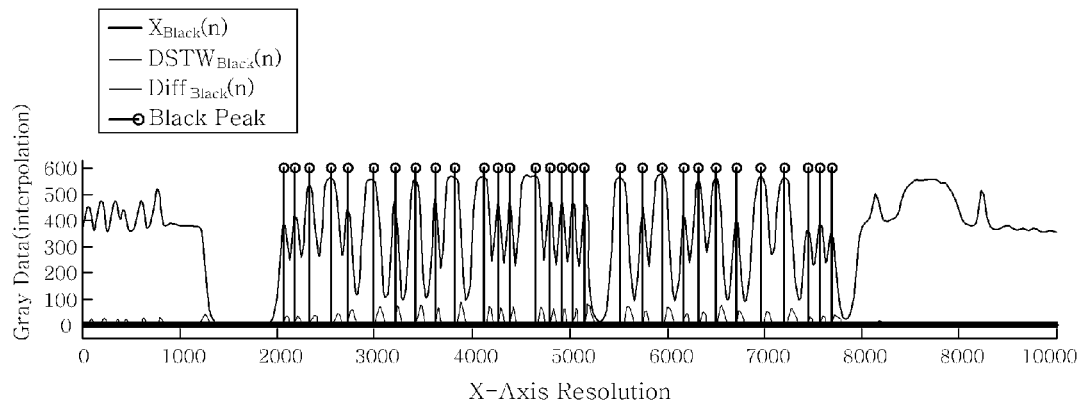

For example, in the case of the UPC-A barcode, 30 peaks are detected for each of the black and white modules. FIG. 10c is a graph illustrating a result of detecting effective barcode peaks of FIG. 10a.

Meanwhile, a gray signal obtained from the barcode image is caused by non-specific illumination when acquiring an image, and distorts a baseline of a signal as shown in FIG. 5b. Such a gray signal is generated because each module of the barcode is shifted from the original signal, thus causing an error when the barcode signal is translated into binary code. The normalizing unit 23 of FIG. 6 eliminates the distortion of the baseline using the following equation, based on the fact that the non-specific illumination is distributed in a low frequency band of the gray signal.

$$P(k) = P_B(n) + P_W(n), 1 \leq n \leq 30, 1 \leq k \leq 60 \quad \text{<Equation 9>}$$
$$C = \frac{G_B[P(k)] + G_B[P(k+1)]}{2}$$

if ($i$ is odd)  <Equation 10>
if ($G_B(m) \geq C$), $R(k) = m$,
$1 \leq k \leq 59$, $P(n) \leq m \leq P(n+1)$
else if ($i$ is even)
if ($G_B(m) \leq C$), $R(k) = m$ In equation 9, $P_B(n)$ and $P_W(n)$ are peaks in the $G_B$ signal for the black and white modules, respectively, and P(k) is a vector that is the position sum of the modules. C denotes a mean of peak data of the $G_B$ signal at which P(k) and P(k+1) are located. If C is calculated, a position of C in the $G_B$ signal, R(k) must be found, which is represented in equation 10.

Figure 11A:
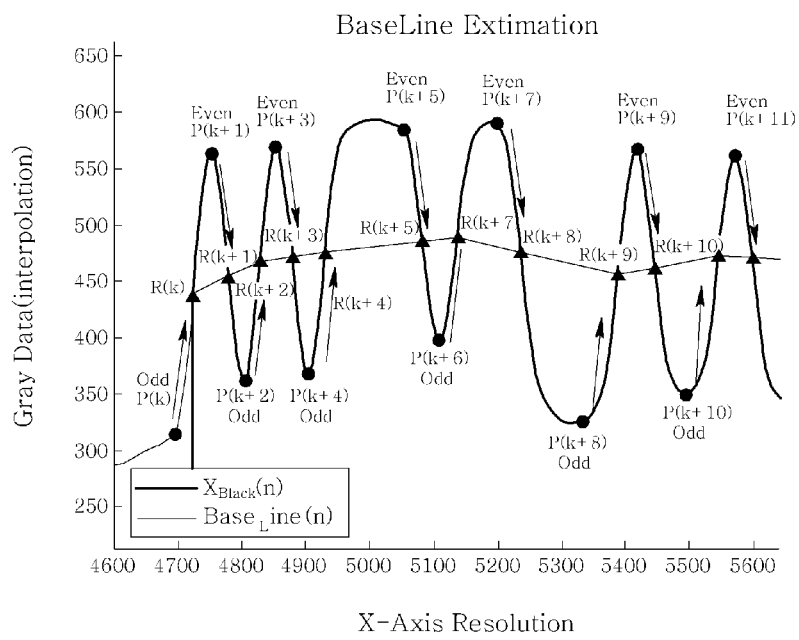
FIG. 11a is a graph illustrating a method of finding a mean of peak data using a normalizing unit of FIG. 6.

FIG. 11a is a graph illustrating a method of finding a mean of peak data using the normalizing unit of FIG. 6.

As shown in the drawing, if k is an odd number, R(k) is found when the $G_B$ signal is greater than C. In contrast, if k is an even number, R(k) is found when the $G_B$ signal is less than C. After R(k) is obtained for the whole signal $G_B$, the baseline connecting R(k) points to each other should be made. To this end, the normalizing unit 23 uses linear interpolation of equation 11.

$$B(i) = \frac{G_B[R(k+1)] - G_B[R(k)]}{R(k+1) - R(k)} \times (i - R(k)) + G_B[R(k)], \quad \text{<Equation 11>}$$
$$1 \leq k \leq 59, R(k) \leq i \leq R(k+1)$$

Figure 11B:
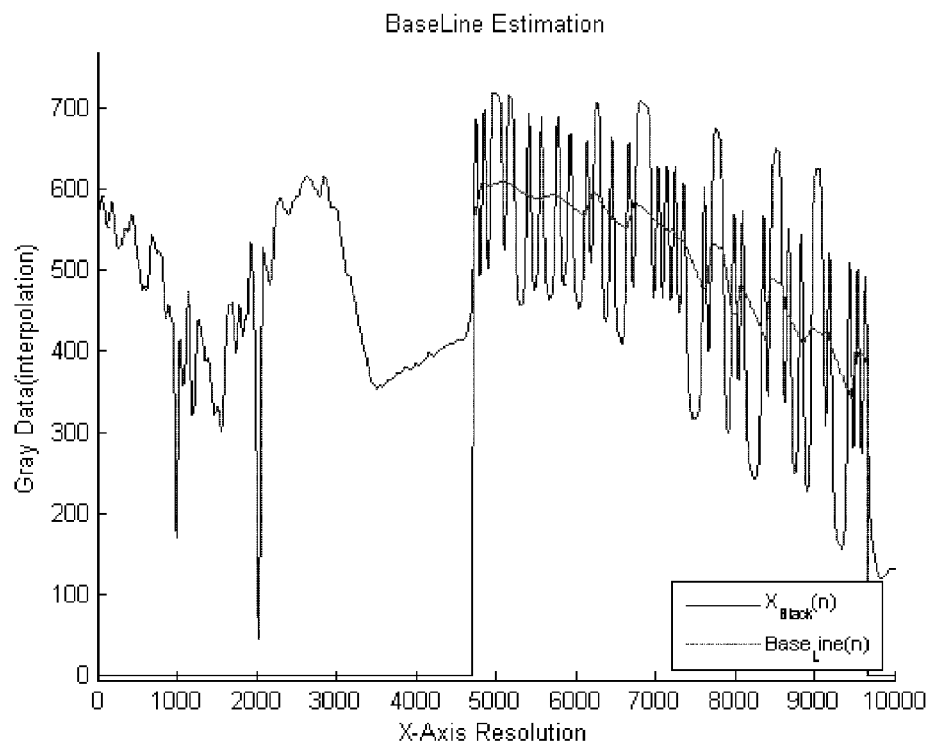
FIG. 11b is a graph illustrating a baseline obtained by the normalizing unit of FIG. 6.

FIG. 11b is a graph illustrating a baseline of FIG. 5b obtained by the normalizing unit of FIG. 6. The normalizing unit 23 removes the baseline using the following equation 12.

$B_R(i) = 2 \times \text{mean}[B] - B(i), 1 \leq i \leq 10,000$ $G_{BF}(i) G_B(i) + B_R(i)$  <Equation 12>

Figure 11C:
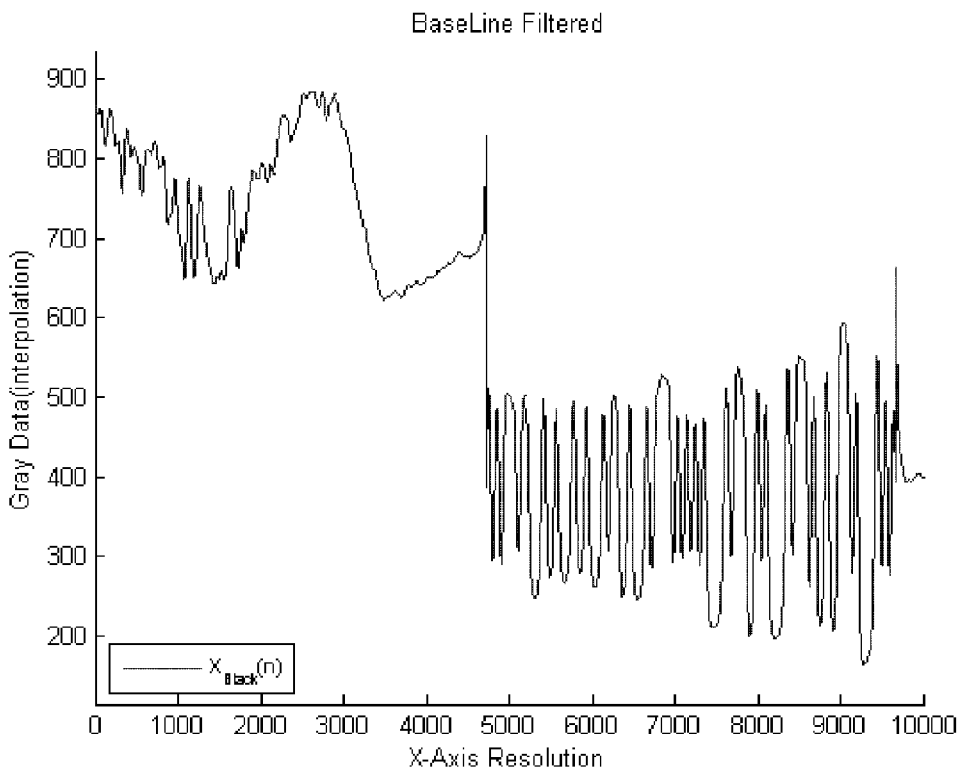
FIG. 11c is a graph illustrating a result obtained after the normalizing unit of FIG. 6 removes the baseline of FIG. 11b.

FIG. 11c is a graph illustrating a result obtained after the normalizing unit 23 of FIG. 6 removes the baseline of FIG. 11b. As such, the normalizing unit 23 removes the baseline, thus minimizing an error caused by non-specific illumination when acquiring the barcode image.

The estimation unit 24 of FIG. 6 converts a signal of a sine wave, obtained after the baseline is removed by the normalizing unit 23, into a signal of square wave, thus estimating a barcode signal.

Figure 12:
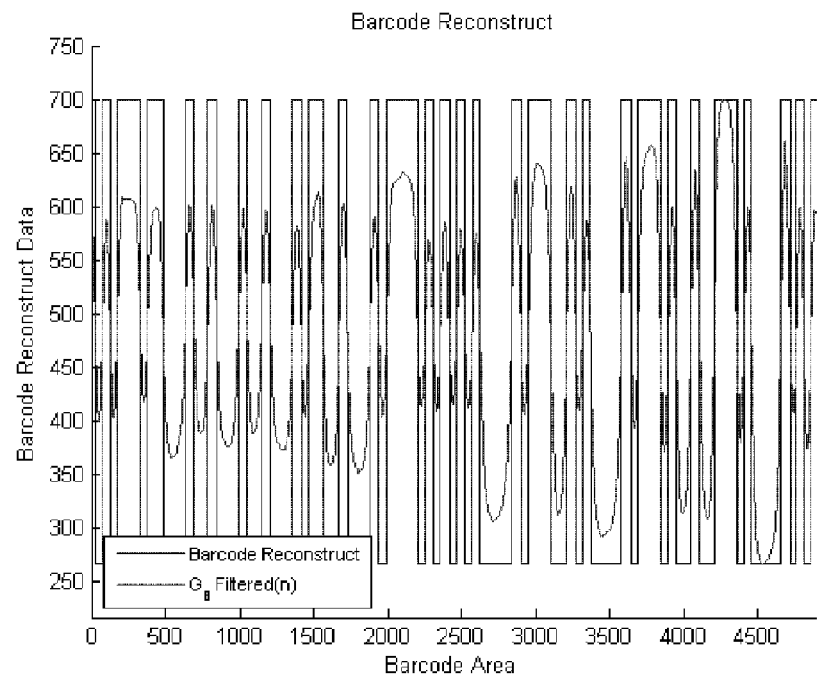
FIG. 12 is a graph illustrating a result of a barcode signal of FIG. 5a estimated by an estimation unit of FIG. 6.

Since the $G_B$ signal from which the baseline is removed by the normalizing unit 23 takes a shape of a sine wave, it is difficult to determine a size of the module. Thus, the estimation unit 24 converts the sine wave into the square wave, as shown in FIG. 12. FIG. 12 is a graph illustrating a result of a barcode signal of FIG. 5a estimated by the estimation unit of FIG. 6. The estimation of the estimation unit 24 is performed according to the following equations 13 and 14.

$$C_F = \frac{\text{Arg}[G_{BF}(i)] - \text{Arg}_{min}[G_{BF}(i)]}{2} + \text{Arg}_{min}[G_{BF}(i)], \quad \text{<Equation 13>}$$
$$P(1) \leq i \leq P(60)$$

if ($G_{BF}(i) \leq C_F$), $P(1) \leq i \leq P(60)$  <Equation 14>
$L(i) = \text{Arg}_{max}[G_{BF}(i)]$
else if ($G_{BF}(i) < C_F$)
$L(i) = \text{Arg}_{min}[G_{BF}(i)]$ In equation 13, $C_F$ is a reference of $G_{BF}(i)$ for generating a square wave. If $G_{BF}(i)$ exceeds $C_F$, a maximum value of $G_{BF}(i)$ is inputted into L(i) of equation 14. In contrast, if $G_{BF}(i)$ is less than $C_F$, a minimum value of $G_{BF}(i)$ is inputted into L(i) of equation 14. Such a conversion allows a square wave of FIG. 12 to be similar to that of an ideal barcode signal shown in FIG. 4b.

For such a signal converted into the square wave, the decoding unit 30 of FIG. 2 estimates the width of the black and white modules to extract binary data, and decodes data using American Standard Code for Information Interchange I (ASCII). It is obvious that a decoding result is not limited to the ASCII but may be decoded in various data.

It will be described below in detail.

Each of the black and white modules of the barcode comprises modules having four kinds of widths from 1 to 4. When acquiring the real barcode image, the pixel size of one module is variably changed for several reasons, including illumination, rotation of the subject, tilting of the camera, and auto focusing conditions. Here, a distance between pixels of each module may be calculated using L(i) of equation 14, and each width from 1 to 4 of each module may be estimated.

Figure 13A:
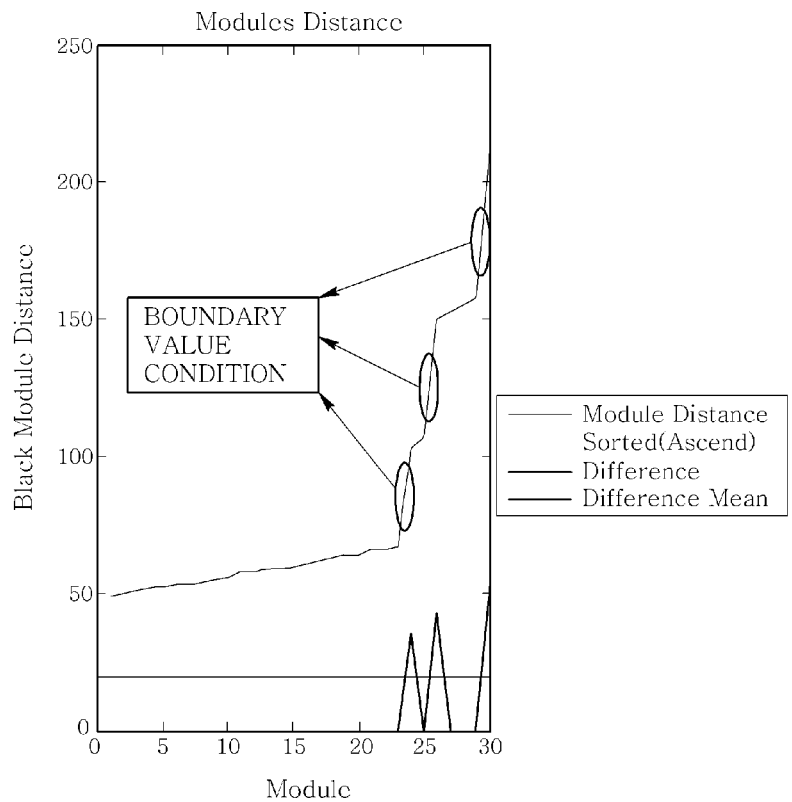
FIGS. 13a and 13b are graphs illustrating determination of a module width based on a distance between pixels and a boundary value condition.
Figure 13B:
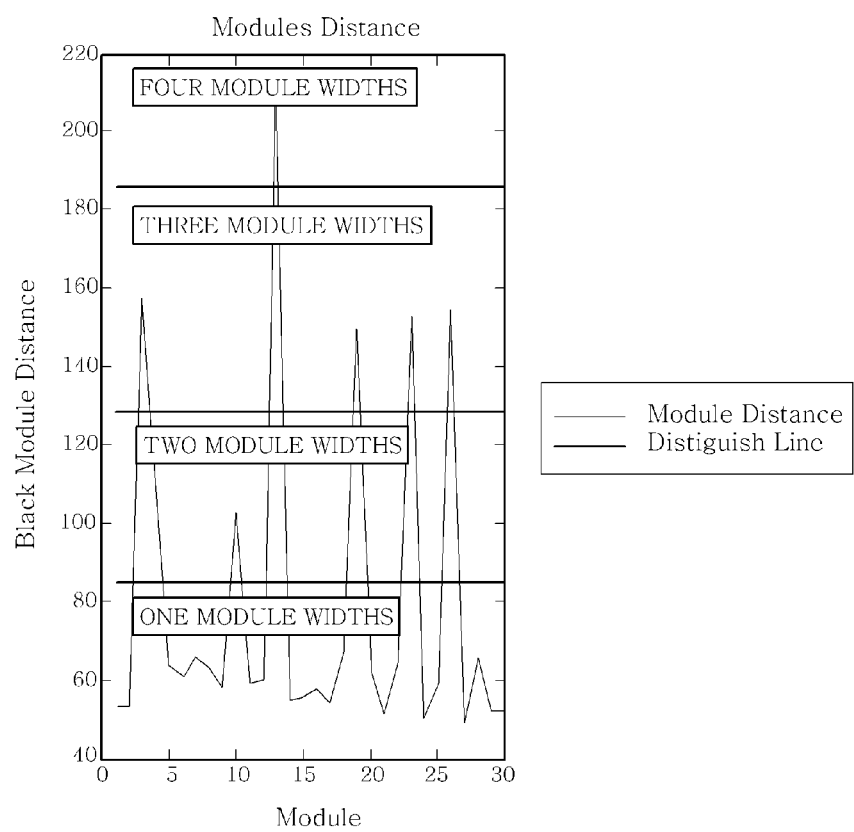

FIGS. 13a and 13b are graphs illustrating determination of a module width based on a distance between pixels and a boundary value condition.

If distances between pixels are arranged in descending order, it can be observed that they are shown in waveform as shown in FIG. 13a and are shown in a step shape according to a module width. If a boundary value is calculated according to the module width as shown in FIG. 13a, it can be seen that one module width is distinguished from another module width even if the pixel size is variably changed as shown in FIG. 13b. In FIG. 13b, a graph shows a pixel distance before sorting and a flat line shows a module width according to the boundary value.

After widths of the black and white modules of the barcode are determined, the decoding unit 30 generates binary data. Assuming that the module width is 1, 2, 3 and 4, respective black modules are arranged in 1, 11, 111 and 1111 and respective white modules are arranged in 0, 00, 000 and 0000. Afterwards, data is converted into an ASCII code by ASCII decoding that is widely known to those skilled in the art.

Figure 14:
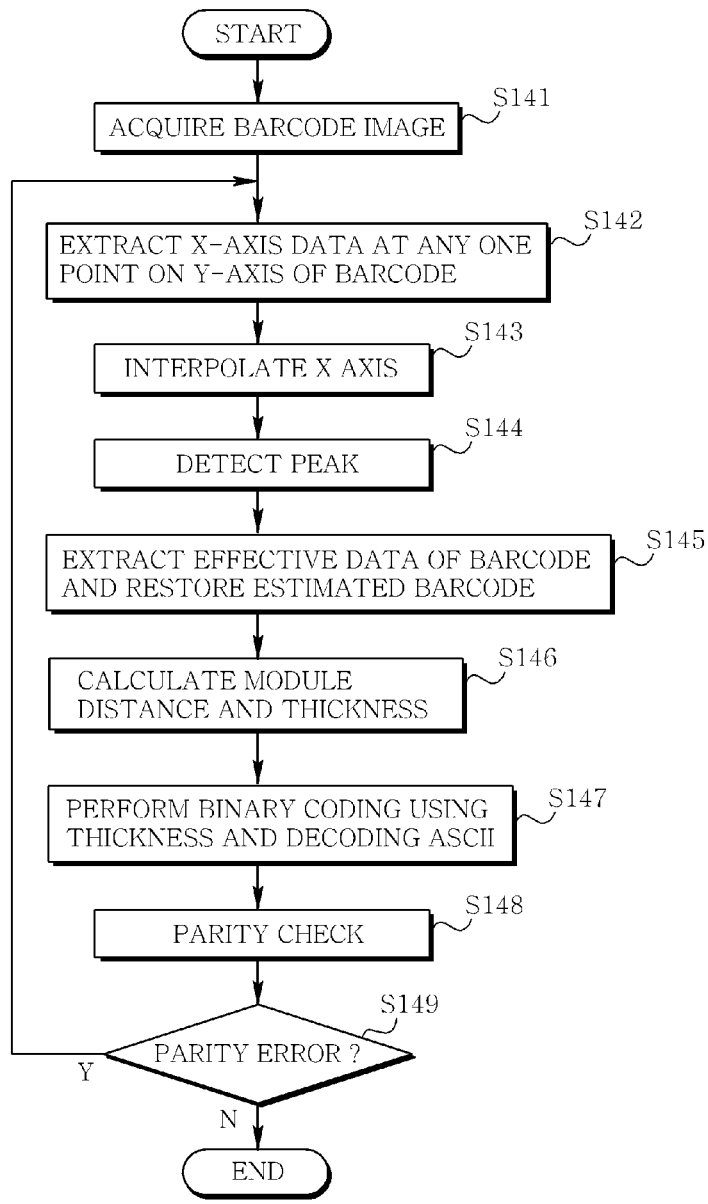
FIG. 14 is a flowchart illustrating a method for recognizing a barcode according to an embodiment of the present invention.

FIG. 14 is a flowchart illustrating a method for recognizing a barcode according to an embodiment of the present invention.

As shown in the drawing, the barcode recognizing method of the present invention acquires the image of the barcode by the photographing means (not shown) installed in the mobile terminal 200, at S141. The extraction unit 10 extracts X-axis data at any one point of the Y-axis barcode region, at S142.

In order to achieve high resolution, an X-axis pixel is extended to 10,000 pixels for example, using a predetermined interpolation method such as cubic spline interpolation, at S143.

Thereafter, the restoration unit 20 detects peaks of the black and white modules of the barcode from the interpolated data at S144. From the detected peaks, effective data is extracted, and an estimated barcode is restored at S145.

Subsequently, the decoding unit 30 calculates a distance between the black and white modules and a thickness of each module in the estimated barcode at S146, binary data is extracted using the thickness, and the ASCII data is decoded based on the binary data at S147.

Finally, the recognizing method of the present invention verifies an error through a parity check at S148. If there is a parity error at S149, the process proceeds to S142 and repeats the above steps. The parity check means a process of checking whether an error occurs using a parity bit (a bit that is added to an information bit to display whether an error occurs when information is transmitted). Since the parity check is widely known to those skilled in the art, a detailed description thereof will be omitted herein.

Meanwhile, the embodiments of the present invention may be implemented by recording a computer-readable program code on a recording medium that may be read by a computer. When the embodiments of the present invention are executed using software, components of the present invention are code segments for executing required operation. Further, programs or code segments may be stored in a medium that may be read by a processor of the computer, or may be transmitted through a transmission media or communication network in a computer data signal combined with a carrier wave.

The computer-readable recording medium may include all kinds of recording devices storing data that may be read by a computer system. For example, the computer-readable recording medium may include a ROM, a RAM, a CD-ROM, a magnetic tape, a floppy disk, an optical-data storage device, etc.

Further, computer-readable recording media may be distributed throughout computer systems connected via networks to store and execute computer-readable codes in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An apparatus for recognizing a barcode, the apparatus comprising:
    an extraction unit configured to select and interpolate X-axis data at an arbitrary Y-axis of the barcode;
    a restoration unit configured to detect peaks of black and white modules of the barcode to restore the barcode; and
    a decoding unit configured to estimate widths of the black and white modules, extract binary data and decode the binary data.

2. The apparatus of claim 1, wherein the extraction unit comprises:
    a selection unit configured to select the X-axis data at the arbitrary Y-axis; and
    an interpolation unit configured to interpolate the X-axis data selected by the selection unit using a predetermined interpolation method.

3. The apparatus of claim 2, wherein the selection unit converts RGB types of X-axis data into black-and-white data.

4. The apparatus of claim 2, wherein the selection unit converts RGB types of X-axis data into peaked data when intensity of a white module signal is high and peaked data when intensity of a black module signal is high.

5. The apparatus of claim 2, wherein the interpolation method includes cubic spline interpolation.

6. The apparatus of claim 1, wherein the restoration unit comprises:
    a peak detection unit configured to detect the peaks of the black and white modules;
    a barcode-region detection unit configured to detect an effective barcode region from output of the peak detection unit;
    a normalizing unit configured to remove a baseline; and
    an estimation unit configured to convert an output of the normalizing unit into a square wave.

7. The apparatus of claim 6, wherein the peak detection unit detects peaks of the black and white modules by a descending slope trace wave (DSTW) signal.

8. The apparatus of claim 7, wherein the peak detection unit obtains the DSTW signal for each of the black and white modules, detects a point where a difference between each of the black and white modules and the corresponding DSTW signal exceeds a predetermined value, and determines a point where previous data becomes zero (0) as the peak.

9. The apparatus of claim 6, wherein the barcode-region detection unit removes an unnecessary peak from the peak of the data received from the peak detection unit to detect the effective barcode region.

10. The apparatus of claim 9, wherein the barcode-region detection unit detects a position from which the effective barcode starts, thus detecting a predetermined number of peaks of subsequent black and white modules.

11. The apparatus of claim 6, wherein the barcode-region detection unit detects a position from which the effective barcode starts, to detect a predetermined number of peaks of subsequent black and white modules.

12. The apparatus of claim 6, wherein the barcode-region detection unit calculates a difference in position between a subsequent peak and a current peak, and detects a position where the difference in position between the subsequent peak and the current peak is greater than a sum thereof and a predetermined weight, to determine the detected position as a position from which the effective barcode starts.

13. The apparatus of claim 12, wherein the barcode-region detection unit detects a predetermined number of peaks of black and white modules subsequent to the position from which the effective barcode starts.

14. The apparatus of claim 6, wherein the normalizing unit calculates a mean of peak data to remove distortion of the baseline.

15. The apparatus of claim 6, wherein the decoding unit estimates a distance between pixels of the black and white modules from the output of the normalizing unit.

16. The apparatus of claim 15, wherein the decoding unit sorts distances between the pixels, and determines a module width based on a boundary value depending on the module width.

17. The apparatus of claim 16, wherein the decoding unit converts binary data of the module width.

18. The apparatus of claim 17, wherein the decoding unit performs decoding in ASCII.

19. The apparatus of claim 1, wherein the decoding unit performs decoding in ASCII.

20. A method for recognizing a barcode, comprising:
selecting and interpolating X-axis data at an arbitrary Y-axis of the barcode;
detecting peaks of black and white modules of the barcode and restoring the barcode; and
estimating widths of the black and white modules, extracting binary data and decoding the binary data.

* * * * *